United States Patent Office 3,441,546
Patented Apr. 29, 1969

3,441,546
POLYMERIZATION CATALYST
Harold K. Garner, Wayne, and Demetreos N. Matthews, Bloomfield, N.J., assignors to Uniroyal, Inc., a corporation of New Jersey
No Drawing. Continuation-in-part of application Ser. No. 304,634, Aug. 26, 1963. This application Mar. 19, 1965, Ser. No. 441,307
Int. Cl. C08f *1/56, 1/42;* B01j *11/84*
U.S. Cl. 260—80.7                                 11 Claims

ABSTRACT OF THE DISCLOSURE

A coordination catalyst for the polymerization of olefins comprising a vanadium salt and an organo metallic material is improved by the addition to a monomer or monomers containing such a catalyst of an organic nitro compound. The latter compound serves to activate the catalyst and as a regulator of the molecular weight of the resulting polymer.

---

This application is a continuation-in-part of our co-pending application Ser. No. 304,634, filed Aug. 26, 1963 and now abandoned.

This invention relates to improved catalysts for the polymerization of olefins, and methods for the polymerization of olefins using these improved catalysts. More particularly the invention comprises catalysts obtained by the interaction of (1) A vanadium salt,
(2) An organometallic compound of a type represented by the formulae
 (a) RMgX (Grignard reagent), where R is a hydrocarbon radical having from 1 to 12 carbon atoms, e.g., an alkyl radical such as methyl, ethyl, etc. or an aryl radical such as phenyl, naphthyl, etc., and X is a halogen atom,
 (b) LiAlR$_4$, where R is as previously defined, and
 (c) R$_A$Al$_2$X$_B$, where R and X are as previously defined, A is a number from 2 to 6, B is a number from zero to 4, and $A+B=6$, and
(3) An organic nitro compound, at least one of the substances (1) and (2) containing at least one halogen atom.

In the following, chemicals (1) and (2), i.e., the vanadium salt, and the Grignard reagent or the organoaluminum compound, or their interaction products, will frequently be referred to as the primary catalyst system, and chemical (3) will be referred to as the activator or, sometimes, as the regulator.

The invention has particular reference to the use, along the described primary catalyst ingredients (1) and (2), of an additional chemical (3), as defined above, which has the surprising effects of (A) activating the catalyst and (B) serving as a regulator of molecular weight of the polymer. The invention comprises any method by which the chemical (3) is reacted with the reaction product of (1) and (2) in the presence of the monomer or monomers. In this way it is ensured that catalyst activation and/or molecular weight regulation of the polymer is achieved.

Polymerization catalysts which are the interaction products of (1) a compound of a metal of Groups IV–B and V–B of the periodic table of the elements (see "Handbook of Chemistry and Physics," 41st Edition, pages 448–9, published by Chemical Rubber Publishing Company, Cleveland, Ohio) and (2) an organometallic compound of a metal of Group III–A of the periodic table are well known through patents and other publications of recent years. Some of these disclosures, such as Schreyer, U.S. 2,962,451, and Ziegler, Belgian Patent 553,655, show catalysts falling within the scope of the primary catalyst systems of the present invention. Schreyer, among others, shows catalysts comprising a vanadium salt and an alkyl-aluminum halide, for the polymerization of ethylene or propylene. Ziegler shows catalysts from VOCl$_3$-trialkylaluminum for the copolymerization of ethylene with higher aplha-olefins. Sometimes the catalysts are insoluble or heterogeneous, and sometimes they are soluble, depending on the exact composition.

The above-described prior catalyst systems, and indeed all other prior art catalysts of this type known to the present inventors, are deficient in that: (a) they show a low catalyst efficiency (here expressed as weight of polymer produced per unit weight of vanadium compound per unit time); (b) the polymerization rate is undesirably slow unless relatively high concentrations of catalyst are used; and, (c) in the case of a soluble catalyst, the activity decreases, often rapidly, during the course of the polymerization. These deficiencies are more serious in the copolymerization of ethylene with propylene or with other olefins having more than two carbon atoms, than in the homopolymerization of ethylene. Furthermore, conventional catalyst systems frequently do not afford an opportunity to regulate or modify the molecular weight of the polymer, especially when only moderate concentrations of catalyst are used.

In British Patent 886,368, United States Rubber Company, published Jan. 3, 1962, improved catalyst systems using VCl$_4$ or VOCl$_3$ with either dialkylaluminum halide or alkylaluminum dihalide alone, or mixtures of the two, are disclosed which show a catalyst efficiency in the copolymerization of ethylene and propylene 10–100 times as great as that of the aforementioned prior art catalysts. Even the improved catalysts of British Patent 886,368 are amenable to substantial further improvement by the addition of the "activators" or "regulators" of the present invention, especially as regards the maintenance of catalytic activity over a relatively long period of polymerization, and as regards the production of polymer of low molecular weight.

The present invention is directed to making more effective and more efficient a primary catalyst system comprising a vanadium salt (1) and an organometallic material (2), as defined previously, by the combination therewith of an activator/regulator (3) selected from the following types of nitro compounds:

(a) Nitroalkanes, e.g., nitromethane, nitroethane, 2-nitropropane, 1-nitropropane, etc.; dinitroalkanes, e.g., 3,5-dinitroheptane, 2,2-dinitropropane; trinitroalkanes, e.g., 2,2,4-trinitrohexane, and the like; and (b) Nitroarenes, e.g., nitrobenzene, m-dinitrobenzene, trinitrotoluene, etc.

The olefins which are polymerized by the present process include ethylene, propylene, and similar alphaolefins, having the formula CH$_2$=CHR in which R is hydrogen or a hydrocarbon radical, particularly a saturated alkyl hydrocarbon radical having from 1 to 8 carbon atoms. Examples of such olefins include, e.g., butene-1, hexene-1, 4-methylpentene-1, 5-methylhexene-1, and 4-ethylhexene-1.

A preferred form of the invention is directed to the copolymerization of ethylene and propylene to yield rubbery products. An especially preferred practice of the invention contemplates the production of unsaturated, sulfur-vulcanizable, rubbery terpolymers of ethylene, propylene, and a diene such as dicyclopentadiene, methylcyclopentadiene dimer, 1,4-hexadiene, 11-ethyl-1,11-tridecadiene, 1,9-octadecadiene, 1,5-cyclooctadiene, or other suitable copolymerizable dienes such as are disclosed in British Patent 880,904 to Dunlop Rubber Co., Oct. 25, 1961; U.S. 2,933,480 to Gresham and Hunt, Apr. 19, 1960; U.S. 3,000,866 to Tarney, Sept. 19, 1961; and Belgian Patents 623,698 and 623,741 to Montecatini, Feb. 14, 1963. These disclosures are herewith incorporated by reference. Preferred terpolymers contain from about 1 to about 25% (more preferably about 2% to about 15%) by weight of dicyclopentadiene or the like. The remaining portion of the interpolymer generally contains from about 25% to about 75% by weight of propylene, the remainder being ethylene.

The primary catalyst system which is to be activated in accordance with the method of our invention comprises, as indicated previously, a reaction product of (1) a vanadium salt and (2) a Grignard reagent or an organoaluminum compound. Among the vanadium salts which may be used, there may be mentioned vanadium halides, oxyhalides, alkoxides and acetylacetonates. Specific examples of these salts are vanadium dichloride, vanadium trichloride, vanadium tetrachloride or tetrabromide, vanadium oxydichloride, vanadium oxytrichloride, alkyl vanadates (especially where the alkyl group contains 1–12 carbon atoms, e.g., n-butyl vanadate), vanadyl or vanadium acetylacetonate, and the like. Also, salts based on mixtures of more than one of the foregoing types, such as dialkyl halovanadates, e.g., dibutyl chlorovanadate, and alkyl dihalovanadates, e.g., butyl dichlorovanadate, may be used. In many cases, preferred vanadium compounds are vanadium oxytrichloride, vanadyl or vanadium acetylacetonate, lower alkyl vanadates (alkyl groups of 1–4 carbon atoms) and halovanadates, especially chlorovanadates (mono- and di-chloro).

Such a vanadium compound (1) is combined with an organometallic compound (2) to give the primary catalyst system in which at least one of the components (1) and (2) must contain at least one halogen atom. Unfortunately such a conventional primary catalyst system, as indicated above, is frequently not as effective as would be desired, and may soon become inefficient or inactive. Also, it does not always provide a polymer having the desired properties.

The present invention is based on our surprising discovery that the primary catalyst system (a) is made more effective, (b) maintains its activity for a longer period, or (c) can be reactivated after it begins to slow down, if there is added a chemical (3) of the kind described; the added chemical unexpectedly serves as a regulator of molecular weight, too.

While we do not desire to limit the invention to any particular theory of operation, it appears possible that the ability of the chemicals (3) to activate the primary catalyst is a consequence of an oxidizing action whereby the chemical (3) transforms at least a part of the vanadium into a valence state of +3 or more. Although the effect is not entirely understood, it appears as though the primary catalyst, as intially produced by the reaction of the vanadium compound (1) and the organometallic compound (2), is originally, or may soon become, inactive (because of the absence of vanadium in a valence state higher than +2) but transformation of some of the vanadium to a higher valence state by chemical (3) reactivates the catalyst. Whatever the explanation, it is indeed surprising that the chemical (3) has the here described beneficial effect on the primary catalyst. The benefits of the use of such a chemical (3) in accordance with the invention are especially important in making ethylene-propylene and ethylene-propylene-diene interpolymers. Such interpolymerization is, in general, much more difficult to effect efficiently than the simple homopolymerization of, for example, ethylene.

It will be understood that, instead of mixing the vanadium compound with an organoaluminum compound directly to form the primary catalyst system, we may produce an equivalent system indirectly by the method of Carrick [J. Am. Chem. Soc. 82, 3883 (1960)], involving, for example, mixing tetraphenyltin, aluminum halide, and vanadium oxytrichloride, whereby phenylaluminum halide is believed to be formed in situ. Such a mixture may be activated in accordance with the present invention.

It will be understood that the empirical formula

$$R_AAl_2X_B$$

used to described the organoaluminum compounds is intended to include any of a wide variety of compounds or mixtures of compounds that might result, for example, from bringing together trialkylaluminum compounds, aluminum trihalides and/or alkylaluminum halides. For example, equimolar mixtures of monoalkylaluminum dihalide and dialkylaluminum monohalide, or equimolar mixtures of trialkylaluminum and aluminum trihalide, may be regarded as producing the alkylaluminum sesquihalide, $R_3Al_2X_3$. A mixture of trialkylaluminum and dialkylaluminum monochloride may be regarded as providing a material of the formula $R_5Al_2Cl$. It should be noted that the formula $R_AAl_2X_B$ as defined permits the use of trialkylaluminum as such, but not of aluminum trihalide as such. It is understood that such aluminum compounds are here represented by bimolecular formulae having two Al atoms.

The preferred primary catalyst system for use in producing binary and ternary copolymers of ethylene and propylene, in the present invention is a soluble catalyst (by which we mean soluble in organic hydrocarbons, including the monomers to be polymerized), formed by interaction of vanadium oxytrichloride and an alkylaluminum sesquihalide. By alkylaluminum sesquihalide we mean either the alkylaluminum sesquihalide as such, i.e., $R_3Al_2X_3$, or a mixture containing a substantial amount of the sesquihalide. Such mixture may be represented by the empirical formula $R_AAl_2X_B$ where $A+B=6$, A is from 1.2 to 4.8, and B is correspondingly from 4.8 to 1.2, and may be formed by admixing appropriate amounts of dialkylaluminum halide with alkylaluminum dihalide, or by mixing appropriate amounts of trialkylaluminum with aluminum trihalide. In the preferred alkylaluminum halides the alkyl group is a lower alkyl, typically of 1 to 4 carbon atoms, and the halogen is chlorine.

In preferred soluble primary catalyst systems, the molar ratio of aluminum to vanadium is at least 5:1, and preferably at least 10:1; higher ratios such as 20:1, 35:1, 50:1, etc., may also be used. If desired, even higher ratios of aluminum to vanadium, e.g., 200:1 or higher, may be employed, especially in those cases where the concentration of vanadium compound used is very small.

These preferred soluble primary catalyst systems are remarkable for their ability to form an amorphous, rubbery ethylene-propylene interpolymer of uniform composition, and particularly for their ability to form an amorphous ethylene-propylene-diene interpolymer that is sulfur-vulcanizable to yield a high quality rubber stock.

Although for many purposes the soluble catalyst compositions have been described as preferred, especially for the interpolymerization of ethylene and propylene, it will be understood that in other cases, notably the homopolymerization of propylene, the insoluble or heterogeneous type of catalyst may be used in our invention.

The amount of chemical (3) employed as activator for the primary catalyst system in accordance with the invention, in general, is not especially critical. Surprisingly small amounts of chemical (3), e.g., about 0.01 mole of chemical (3) per mole of vanadium compound (1), may be sufficient in many cases to produce a noticeable activating effect. Usually we prefer to use somewhat larger amounts, typically from about 1 to about 10 moles of chemical (3) per mole of vanadium compound (1), but it will be understood that considerably more chemical (3) than this may be employed, if desired. As much as about 50 moles, or more, can be employed, especially when the mole ratio of organometallic compound (2) to vanadium compound (1) is equal to or greater than 50, or when regulation of the molecular weight is desired. But, in any case, the moles of chemical (3) should not exceed the moles of metal in the amount of organometallic compound (2) taken.

In any given case, the optimum amount of chemical (3) will depend upon the specific composition of the primary catalyst, and the particular chemical (3) used, as well as such variables as the exact polymerization procedure. More than one chemical (3) may be used if desired.

All or part of one or both of the primary catalyst ingredients (1) and (2) will generally be present in the monomeric material at the time the chemical (3) is added or within a short space of time after the addition of the chemical (3). In this way the chemical (3) does not have an opportunity to pre-react appreciably with either of the primary catalyst ingredients in the absence of the other. Prolonged contact of the chemical (3) with one of the primary catalyst ingredients in the absence of the other results in lower polymer yields. One method for carrying out the invention is to combine the primary catalyst ingredients (1) and (2) in the presence of at least a portion of the monomer or monomers and then to add the chemical (3). Another method is to pre-mix the primary catalyst ingredients in the absence of monomers and thereafter to combine the mixture with monomers and chemical (3). In addition to the above methods of delayed addition of chemical (3), one may add all three catalyst ingredients (1), (2) and (3) simultaneously to the monomer or monomers. Another method which can be used is to add the chemical (3) to either of the primary catalyst ingredients (1) or (2) just prior to the addition of the other; however, the other must then be added promptly, before appreciable reaction takes place between (3) and the primary ingredient which was added first. In all cases, the monomers need not be present until reaction commences between the first two ingredients or until the third ingredient is added.

As indicated previously, the chemical (3), added to the conventional catalyst system in accordance with the invention, is inherently capable of performing two important functions: (A) activation, and (B) regulation or modification.

To appreciate the activation function (A), it is helpful to consider first the behavior of the soluble primary catalyst system as conventionally used. In conventional practice the activity of the soluble catalyst, i.e., the rate at which the catalyst produces polymer, is often very satisfactory at the start, but falls off more or less rapidly as the polymerization progresses. However, addition of a small quantity of an activator chemical (3) according to the present invention prevents such decay in activity and restores the activity of the catalyst. The activity of the heterogeneous catalyst can be fairly constant, but addition of chemical (3) increases this activity.

As for the modifying or regulating function (B), the conventional catalyst system tends to give polymer of very high molecular weight. This feature is detrimental to the processing qualities of the polymer. However, the molecular weight of polymer formed when the chemical (3) is added to the catalyst system may be remarkably reduced, so that an easily processable polymer is readily obtained. In fact, liquid polymers can be obtained in this way.

From the standpoint of using the chemical (3) essentially for its activating effect, the usual practice is to add it after the catalyst has become partially spent, thereby revitalizing the catalyst. Thus, repeated small additions of chemical (3) may be made as the polymerization proceeds, to maintain optimum catalyst efficiency throughout the reaction.

From the standpoint of using the chemical (3) essentially for its regulating or modifying effect, it may be added at any time after which it is desired to produce low molecular weight material. For instance, if it is desired to make polymer having a regulated molecular weight over the entire reaction period, addition of chemical (3) is begun at the start of the polymerization. On the other hand, delayed addition of chemical (3) will result in the production of relatively high molecular weight polymer prior to the addition and lower molecular weight polymer subsequent to the addition, so that the final product is a mixture of high and low molecular weight polymers. This may be desirable under some circumstances. The preferred method, both for best yields and for optimum control of molecular weight, is to add the chemical (3) continuously or in small increments as the polymerization proceeds rather than to add a large amount all at once.

The polymerization process is conveniently carried out in an inert solvent, although an added solvent is not essential as the monomers being polymerized may serve as the solvent. In general, the normal solvents used in ionic coordination type polymerizations may be used. These include the aromatic hydrocarbons, aliphatic hydrocarbons, chlorobenzene, tetrachloroethylene, and any other solvents which will not destroy the catalyst. Furthermore, the procedure may otherwise be the same as in conventional practice as far as such details as temperature of polymerization, pressure, concentration of catalyst, and the like, are concerned.

One preferred practice of the invention contemplates continuously interpolymerizing ethylene, propylene and a diene such as dicyclopentadiene. The aforementioned is accomplished by introducing the primary catalyst ingredients (1) and (2) separately into a solution of the monomers in an inert organic solvent. The resulting solution is passed continuously through a polymerization zone, wherein the chemical (3) is added. A stream containing terpolymer is withdrawn from the polymerization zone. These steps may be repeated in one or more subsequent polymerization zones into which the reaction stream, withdrawn from the previous polymerization zone, is successively introduced. There may be incrementally or continuously introduced into each zone more of the primary catalyst ingredients, and/or more of activator-regulator (3), as required, to maintain the system at peak efficiency consistent with economical utilization of catalyst and production of terpolymer of the desired average molecular weight. Additional amounts of one or more of the monomers may be introduced in each subsequent reaction zone, if desired. The stream issuing from the final reaction zone, in the form of a thick solution, or cement, may be processed in the usual way to separate the polymer and remove catalyst residues.

Schreyer, U.S. 2,962,451, teaches catalysts made by mixing a vanadium compound in which the vanadium is in a high valence state, i.e., $+3$ or higher, with an organometallic compound in amount sufficient to reduce the vanadium, at least in part, to a valence state of less than $+3$. While such a catalyst may be activated in accordance with the present invention, it is not essential for purposes of the invention that the vanadium compound employed have a valence of at least $+3$. On the contrary, vanadium compounds in which the vanadium has a valence of less than $+3$, such as vanadium dichloride, may be used. However, it will be understood that in such a case the product obtained by mixing the vanadium compound (1) with the organometallic compound (2) does not become an active catalyst for producing ethylene copolymers until the chemical (3) of the invention is added. This is in contrast to the product obtained by mixing a vanadium $+3$ compound with the organometallic compound, which product is an active catalyst for ethylene copolymerization even before the chemical (3) is added. Although vanadium compounds in which the vanadium has a valence of less than $+3$ may be used in the invention, it is preferred to use vanadium compounds in which the vanadium has a valence of at least $+3$. Such compounds are particularly advantageous from the standpoint of the described continuous polymerization procedure in which the catalyst is introduced into a first polymerization zone without chemical (3), and the chemical (3) is added subsequently after a certain amount of polymerization has taken place.

We are also aware of Berger, U.S. 3,045,001, and we performed certain experiments which demonstrate basic differences between the present invention and the disclosure of Berger. Thus, we have demonstrated that if, following the order of addition of ingredients disclosed by Berger, the chemical (3), nitroethane, is pre-mixed and reacted with the primary catalyst ingredient (1), vanadium oxytrichloride, followed by the addition of ingredient (2), triisobutylaluminum, then the resulting product is not a catalyst for the preparation of ethylene-propylene copolymer (see Example 10). On the other hand, the same primary catalyst components produce ethylene-propylene copolymer in the absence of nitroethane. Similarly, as demonstrated in Example 10 below, no ethylene-propylene copolymer is obtained if vanadium oxytrichloride (1) and nitrobenzene (3) are pre-mixed, following the order of addition taught by Berger, whereas a good yield is obtained by adding the nitrobenzene (3) to the pre-mixed primary catalyst components (1) and (2), following the order of addition as taught by the present invention.

If titanium, instead of vanadium, is used as the transition metal we do not observe any improvement in the catalyst efficiency as a result of attempted catalyst activation by our method. Furthermore, pre-mixing nitroethane with titanium tetrachloride before contacting the titanium tetrachloride with triisobutylaluminum and monomers gives only a very small yield of the polymer. This is another demonstration of the inapplicability of the Berger teaching to the present invention (see Example 11).

The following examples will serve to demonstrate the practice of the invention in more detail. In all examples the catalyst efficiency is given in terms of grams of polymer produced per gram of $VOCl_3$.

Example 1

This example shows activation of a pre-mixed catalyst by means of nitrobenzene, in the formation of ethylene-propylene rubber.

In a one-liter flask equipped with condenser, stirrer, thermometer, dropping funnel and a tube for the subsurface feeding of gaseous monomers, 350 cc. of purified benzene was saturated at atmospheric pressure and ambient temperature by an equimolar feed consisting of high purity ethylene and propylene, using a total feed rate of four liters per minute. Without interrupting the monomer feed, 16 ml. of a benzene solution containing one millimole of $Et_3Al_2Cl_3$ and 0.1 millimole of $VOCl_3$ (pre-mixed catalyst) was added. After five minutes the temperature had risen about 2° C. Thus far the example follows known catalyst addition procedures and yet no reaction has taken place.

At this point the dropwise addition of a benzene solution containing 0.01 millimole of nitrobenzene was begun. The temperature started to rise immediately, rising as much as 19°. Addition of the nitrobenzene solution required 25–30 minutes. After 30 minutes, 15 cc. of isopropanol was added to destroy active catalyst. The solution was then treated with 10 cc. of a 5% solution of antioxidant, 2,2'-methylene-bis-(4-methyl - 6 - t - butylphenol), in toluene, and the polymer was flocculated in methanol. After being chopped in a Waring Blendor the polymer was vacuum-dried at 40° C.; yield, 11.1 g. The catalyst efficiency was 640. No crystallinity could be detected by X-ray. The weight ratio of propylene to ethylene in the polymer was 36/64, and the intrinsic viscosity (at 135° C. in tetralin) was 2.27.

In a similar manner, other organic nitro compounds as nitromethane, dinitrobenzene, dinitrochlorobenzene, 1-nitropropane, p-nitroanisole, and the like may be employed as activators in accordance with the invention.

Example 2

The illustrations herewith set forth as Example 2 illustrate the activation of other primary catalyst systems by means of other chemicals (3), for ethylene-propylene polymerizations. The technique of mixing the primary catalyst ingredients in the absence of monomers, denoted I in the table below, was used in one case (with butyl vanadate as co-catalyst) to accentuate the difference between the relatively poor yields obtained in the absence of the chemical (3) as in the prior art, and the very high yields obtained by the use of the chemical (3) in accordance with our invention. Thus, this method affords a good screening test of chemicals (3) for use as activators.

With the vanadium acetylacetonate the normal mixing procedure (denoted II), as developed in conjunction with this invention, was used.

The chemicals (3) used as activators in these examples were nitroethane and 2-nitropropane. In these examples the procedure was substantially as described in Example 1.

| Example No | 2a | 2b | 2c | 2d |
| --- | --- | --- | --- | --- |
| Catalyst | $Et_3Al_2Cl_3$ | $Et_3Al_2Cl_3$ | $Et_3Al_2Cl_3$ | $Et_3Al_2Cl_3$ |
| Mmole | 1 | 1 | 0.25 | 0.25 |
| Co-catalyst | $VO(BuO)_3$ | $VO(OBu)_3$ | $V(AcAc)_3$ | $V(AcAc)_3$ |
| Mmole | 0.1 | 0.1 | 0.1 | 0.1 |
| Ratio, Al/trans. metal | 20/1 | 20/1 | 5/1 | 5/1 |
| Solvent | (¹) | (¹) | (¹) | (¹) |
| Volume, ml | 700 | 700 | 700 | 700 |
| Feed ratio, P/E | 2/2 | 2/2 | 2/2 | 2/2 |
| Total feed liters/min | 4 | 4 | 4 | 4 |
| Chemical (3) | A | (²) | (²) | B |
| Mmole | 0.1 | | | 0.1 |
| Ratio, Chemical (3)/trans. metal | 1 | | | 1 |
| Reaction condition | I | I | II | II |
| Reaction temperature range, ° C | 22–31 | (³) | 21–38 | 21–37 |
| Reaction time, min | 30 | 30 | 30 | 30 |
| Yield, g | 6.9 | 2.2 | 16.6 | 19.0 |
| Efficiency | 241 | 78 | 477 | 546 |
| Percent crystallinity, X-ray | (²) | | (²) | (²) |
| Weight ratio P/E by infrared | 35/65 | | 60/40 | |
| Intrinsic viscosity (135° C.) | 1.89 | | 4.73 | 3.69 |

¹ Benzene.
² None.
³ No Exotherm.
Key: A=Nitroethane; B=2-nitropropane; I=Premixed Catalyst; II=Catalyst components mixed in presence of monomers.

In a similar manner, the activation method of the invention may be applied to primary catalyst systems produced from other vanadium compounds such as vanadium dichloride, vanadium trichloride, vanadium tetrabromide, vanadium tetrachloride, vanadyl acetylacetonate, dibutyl chlorovanadate, butyl dichlorovanadate, and the like.

Example 3

This example shows that the chemicals (3) may be quite beneficially employed as activators in a terpolymer system, too. The terpolymer yield with the chemical (3) as an activator is herein compared to a terpolymer yield without the activator, thus showing the large increase in efficiency when the chemical (3) is used.

A terpolymer of ethylene, propylene and dicyclopenta-1, can be produced from pre-mixed catalyst (1) and (2) and a chemical (3) used as an activator.

In each of the Examples 4–7 the primary catalyst was pre-mixed and the chemical (3), used as an activator, was added over the length of the run.

| Example No | 4 | 5 | 6 | 7 |
|---|---|---|---|---|
| Catalyst | $Et_3Al_2Cl_3$ | $Et_3Al_2Cl_3$ | $Et_3Al_2Cl_3$ | $Et_3Al_2Cl$ |
| Mmole | 1.0 | 1.0 | 1.0 | 1.0 |
| Co-catalyst | $VOCl_3$ | $VOCl_3$ | $VOCl_3$ | $VOCl_3$ |
| Mmole | 0.1 | 0.1 | 0.1 | 0.1 |
| Ratio Al/transition metal | 20/1 | 20/1 | 20/1 | 20/1 |
| Solvent | (²) | (²) | (²) | (²) |
| Volume (ml.) | 350 | 350 | 350 | 350 |
| Ethylene feed (liters/min.) | 2 | 2 | 2 | 2 |
| Second olefin volume (ml.) | -- | -- | (³) | (⁴) |
| Activator/mmole | None | A/0.1 | A/0.1 | A/0.1 |
| Ratio activator/trans. metal | -- | 1/1 | 1/1 | 1/1 |
| Reaction temp. (° C.) | 22–41 | 22–61 | 22–31 | 24–43 |
| Reaction time (min.) | 10 | 10 | 30 | 30 |
| Reaction condition | I | I | I | I |
| Yield (g.) | 6.5 | 10.4 | 8.6 | 9.4 |
| Efficiency | 375 | 600 | 497 | 543 |
| Wt. Ratio P/E (by I.R.) | | | | ¹ 16/84 |
| Intrinsic viscosity (135° C. in tetralin) | | | | 1.73 |

¹ Percent by wt. of octane-1 estimated by I.R.
² Benzene.
³ Hexene-1.
⁴ Octene-1.
Key: A=Nitroethane; I=Pre-mixed catalyst.

diene was prepared in a five-gallon pressurized reactor equipped with a stirrer. The dried reactor was loaded in an atmosphere of dry nitrogen with 13.3 kg. of benzene purified by percolation through activated silica gel. After evacuation of the reactor a 30-gram sample of purified dicyclopentadiene (DCPD) was added, followed by approximately 2 pounds of propylene (total pressure in the reactor, 15 p.s.i.g.). Ethylene was then charged to an equilibrium pressure of 45 p.s.i.g. Fifty-two grams of a 20% solution of $EtAlCl_2$ in n-hexane was added, followed by 50.25 grams of a 20% solution of diethylaluminum chloride in hexane, and 14.1 g. of a 10% solution of pervanadyl chloride in benzene. Polymerization began at once. Additional ethylene and propylene were metered into the reactor continuously during the polymerization at a molar ratio of 1/1 and at a rate sufficient to keep the reactor at constant pressure. After 20 minutes, 20 g. of DCPD was added, and after 50 minutes a third addition of DCPD of 20 g. was made. An initial activator shot of 0.715 g. of nitroethane was added 30 minutes after polymerization began, followed by a second addition of an equal amount at 60 minutes. The run was stopped after 1.5 hours by cutting off the monomer flow. The reaction mixture was drained from the reactor into 200 ml. of isopropanol containing 20 g. of tris(nonylphenyl) phosphite, an antioxidant, to destroy the active catalyst and protect the polymer. The polymer was then precipitated by an excess of isopropanol containing some antioxidant. After an alcohol wash it was finally vacuum-dried. A yield of 1020 g. was obtained, giving an efficiency of 725 g. of polymer per g. of $VOCl_3$.

A similar run in which the chemical (3) was omitted gave an efficiency of only 300 g. of polymer per g. of $VOCl_3$.

The intrinsic viscosities in tetralin at 135° C. were 1.36 and 1.40 respectively, the P/E weight ratios were 47/53 and 47/53, and the Mooney viscosity (ML–4 at 212° F.) of both polymers from these two runs was 50.

Examples 4–7

Contrary to the case of ethylene-propylene polymerization, ethylene by itself can be polymerized by a pre-mixed soluble catalyst, i.e., the method previously known in the art. However, activation of this catalyst by addition of nitroethane does give a large increase in efficiency of polymerization as is illustrated by Examples 4 and 5.

Examples 6 and 7 show that other copolymers such as those of ethylene plus hexene-1, and ethylene plus octene- Examples 8 and 9 illustrate the use of nitro compounds as molecular weight regulators.

Example 8

This example illustrates the use of a high ratio of chemical (3) to vanadium (50/1), using 2-nitropropane. This condition leads to molecular weight regulation.

In a two-liter flask equipped as in Example 1, 700 cc. of purified n-heptane was saturated at atmospheric pressure and ambient temperature by an equimolar feed of high purity ethylene and propylene, using a total feed rate of 4 liters per minute. Without interrupting the monomer feed, one millimole of $Et_3Al_2Cl_3$ and 0.02 millimole of $VOCl_3$ (as n-heptane solutions) were added consecutively (Al/V=100/1). Immediately, the dropwise addition of 1.0 millimole of 2-nitropropane (as 60 ml. of n-heptane solution) was begun, and continued throughout the polymerization (30 min.). After 30 minutes, 15 ml. of isopropanol was added to destroy the active catalyst. The solution was then treated with 10 cc. of a 5% toluene solution of antioxidant, 2,2'-methylenebis (4-methyl-6-t-butylphenol), and the polymer was flocculated in one liter of a 50/50 (by volume) mixture of methanol and acetone. After being chopped in a Waring Blendor the polymer was vacuum-dried.

Yield _____ grams__ 10.7
P/E _____ 25/75
I.V. (135° C. in tetralin) _____ 2.62

Example 9

This example also illustrates the use of a high ratio of chemical (3) to vanadium (50/1), this time using nitrobenzene. This is another good example of molecular weight regulation.

In a two-liter flask equipped as in Example 1, the procedure of Example 11 was followed except that nitrobenzene was used as the chemical (3), to effect molecular weight regulation.

Yield _____ grams__ 15.2
P/E _____ 33/67
I.V. (135° C. in tetralin) _____ 1.45

For comparison, another run was made, identical to Examples 8 and 9 except that no regulator was introduced, with the following results:

Yield _____ grams__ 4.8
P/E _____ 31/69
I.V. (135° C. in tetralin) _____ 4.50

Thus, it is observed from the intrinsic viscosity values that the molecular weight of the polymer has, in fact, been regulated by addition of chemical (3).

As stated above, mixtures of ethylaluminum dichloride and diethylaluminum chloride which contain no more than 20% of free dichloride or monochloride can be used in place of the sesquichloride. In place of an organoaluminum compound in the primary catalyst system, one can use a Grignard reagent such as phenylmagnesium bromide, ethylmagnesium chloride, and the like, or lithium aluminum tetraalkyls such as lithium aluminum tetraethyl, and the like, with similar results. Similarly, the system of Carrick (tetraphenyltin+aluminum halide+vanadium compound) may be used as a means of providing in situ a combination of organoaluminum halide and vanadium compounds, to be activated in accordance with the method of the invention.

The following runs 10–12 are not examples of the invention but illustrate the procedure of Berger, U.S. Patent No. 3,045,001.

| Run No | 10 | 11 | 12 |
|---|---|---|---|
| Catalyst | Al(i-Bu)$_3$ | Al(i-Bu)$_3$ | Et$_3$Al$_2$Cl$_3$ |
| Mmoles | 3 | 3 | 1.0 |
| Co-catalyst | VOCl$_3$ | TiCl$_4$ | VOCl$_3$ |
| Mmoles | 1 | 1 | 0.1 |
| Cat./cocat. ratio | 3/1 | 3/1 | 20/1 |
| E/P ratio (feed) | 1 | 1 | 1 |
| Total feed (liters/min.) | 4 | 4 | 4 |
| Activator | EtNO$_2$ | EtNO$_2$ | (¹) |
| Mmole | 1 | 1 | 1 |
| Reaction condition | I | I | II |
| Reaction time (min.) | 30 | 30 | 30 |
| Solvent | (²) | (²) | (²) |
| Yield of polymer | None | 2.5 | None |

¹ Nitrobenzene.
² Benzene.
KEY: I. Transition metal salt and activator pre-mixed; II. VOCl$_3$ and activator pre-mixed, then added to the system containing Et$_3$Al$_2$Cl$_3$.

The addition of the nitroethane to the VOCl$_3$ in Run 10 did not change the blood-red color of the VOCl$_3$-benzene solution. No precipitate was observed.

The TiCl$_4$ in benzene (Run 11) gives a bright yellow-colored solution. Upon addition of the nitroethane the color becomes a light orange. Again no precipitate was observed.

In all cases the addition of pure nitroethane to concentrated VOCl$_3$ gave two layers.

The results of the above experiments substantiate the differences discussed earlier between this invention and the Berger patent.

Having thus described our invention, what we claim and desire to protect by Letters Patent is:

1. A method for copolymerizing ethylene and an alpha-olefin containing at least three carbon atoms comprising contacting said monomers with a catalyst made by mixing a primary catalyst comprising:
   (1) a vanadium salt, and
   (2) an organometallic compound selected from the group consisting of those of the formulae
       (a) RMgX, where R is a hydrocarbon radical and X is a halogen atom,
       (b) LiAlR$_4$, where R is as above defined, and
       (c) R$_A$Al$_2$X$_B$, where R and X are as previously defined, A is a number from 2 to 6, B is a number from zero to 4, and A+B=6,
at least one of the substances (1) and (2) containing at least one halogen atom, an organic nitro compound selected from the group consisting of nitroalkyl and nitroaryl compounds being introduced to the monomer-catalyst mixture simultaneously with or subsequently to the introduction of the substances (1) and (2) to said monomers.

2. A method of copolymerizing ethylene and propylene comprising contacting said monomers with a catalyst made by interacting
   (1) a vanadium salt, and
   (2) an organometallic compound selected from the group consisting of those of the formulae
       (a) RMgX, where R is a hydrocarbon radical and X is a halogen atom,
       (b) LiAlR$_4$, where R is as above defined, and
       (c) R$_A$Al$_2$X$_B$, where R and X are as above defined, A is a number from 2 to 6, B is a number from zero to 4, and A+B=6,
and thereafter introducing to the monomer-catalyst mixture in measured amounts over a period of time during the polymerization reaction,
   (3) a nitroalkane or a nitroarene,
the mole ratio of (2):(1) being from 5:1 to 200:1, the mole ratio of (3) to multivalent metal in (2) being equal to or less than unity, and at least one of the substances (1) and (2) containing at least one halogen atom.

3. A method of copolymerizing ethylene, propylene, and a copolymerizable diene to form an amorphous, sulfur-vulcanizable rubber comprising contacting said monomers with a catalyst comprising the products of interaction of
   (1) a vanadium salt in which the vanadium has a valence of at least +3, and
   (2) an alkylaluminum compound in amount sufficient to reduce the said vanadium at least in part to a valence of less than +3, said compound being LiAlR$_4$, where R is a hydrocarbon radical, and thereafter introducing to the monomer-catalyst mixture continuously or incrementally during the polymerization reaction
   (3) an organic nitro compound selected from the group consisting of nitroalkyl and nitroaryl compounds,
the mole ratio of (3) to aluminum being not greater than unity, and at least one of the substances (1) and (2) containing at least one halogen atom.

4. A method of making a sulfur-vulcanizable, unsaturated, amorphous interpolymer of ethylene, propylene, and dicyclopentadiene comprising contacting the said monomers with a hydrocarbon soluble catalyst composition comprising the products of interaction of (1) material selected from trialkyl vanadates and vanadium oxytrichloride with (2) an alkylaluminum chloride of the formula R$_A$Al$_2$Cl$_B$ in which R is a lower alkyl group, A+B=6, A is from 1.2 to 4.8, and B is correspondingly from 4.8 to 1.2, and a nitroalkane, the mole ratio of aluminum to vanadium being from 5:1 to 200:1 and the moles of nitroalkane being not greater than the moles of aluminum in the amount of alkylaluminum chloride taken, the said nitroalkane being introduced simultaneously with or subsequently to introduction of said products of interaction to the said monomers.

5. A method as in claim 4 in which the said nitroalkane is nitroethane.

6. A method as in claim 4, in which the nitroalkane is 2-nitropropane.

7. A method as in claim 4 in which the nitroalkane is 1-nitropropane.

8. A method as in claim 4 in which the nitroalkane is nitromethane.

9. A method of making a sulfur-vulcanizable, unsaturated, amorphous interpolymer of ethylene, propylene, and dicyclopentadiene comprising contacting the said monomers with a hydrocarbon soluble catalyst composition comprising the products of interaction of (1) vanadium oxytrichloride and (2) an alkylaluminum chloride of the formula R$_A$Al$_2$Cl$_B$ in which R is a lower alkyl group, A+B=6, A is from 1.2 to 4.8, and B is correspondingly from 4.8 to 1.2, and a nitroarene, the mole ratio of aluminum to vanadium being from 5:1 to 200:1 and the moles of nitroarene being not greater than the moles of aluminum in the amount of alkylaluminum chloride taken, the said nitroarene being introduced simultaneously with or subsequently to introduction of said products of interaction to the said monomers.

10. A method as in claim 9 in which the nitroarene is nitrobenzene.

11. A method of copolymerizing ethylene, propylene and a copolymerizable diene to form an amorphous, sulfur-vulcanizable rubber comprising contacting said monomers with a catalyst comprising the products of interaction of
   (1) a vanadium salt in which the vanadium has a valence of at least +3, and
   (2) an alkylaluminum compound in amount sufficient to reduce the said vanadium at least in part to a valence of less than +3, said compound being $R_AAl_2X_B$, where R is a hydrocarbon radical, X is a halogen atom, A is a number from 2 to 6, B is a number from zero to 4 and A+B=6,
and thereafter introducing to the monomer-catalyst mixture continuously or incrementally during the polymerization reaction
   (3) an organic nitro compound selected from the group consisting of nitroalkyl and nitroaryl compounds, the mole ratio of (3) to aluminum being not greater than unity, and at least one of the substances (1) and (2) containing at least one halogen atom.

References Cited
UNITED STATES PATENTS

| | | |
|---|---|---|
| 3,045,001 | 7/1962 | Berger. |
| 3,146,224 | 8/1964 | Coover et al. _____ 260—93.7 |
| 3,203,940 | 8/1965 | Long _____ 260—88.2 |
| 3,211,709 | 10/1965 | Adamek et al. |

JOSEPH L. SCHOFER, *Primary Examiner.*

STANFORD M. LEVIN, *Assistant Examiner.*

U.S. Cl. X.R.

260—80.78, 88.2; 252—429